United States Patent
Wakid (10) Patent No.: US 12,423,131 B1
(45) Date of Patent: Sep. 23, 2025

(54) MESSAGE SECURITY MANAGEMENT NESTED PLATFORMS

(71) Applicant: Morgan Stanley Services Group Inc., New York, NY (US)

(72) Inventor: Shukri Wakid, Gaithersburg, MD (US)

(73) Assignee: Morgan Stanley Services Group Inc., New York, NY (US)

(*) Notice: Subject to any disclaimer, the term of this patent is extended or adjusted under 35 U.S.C. 154(b) by 506 days.

(21) Appl. No.: 18/095,228

(22) Filed: Jan. 10, 2023

(51) Int. Cl.
G06F 9/455 (2018.01)

(52) U.S. Cl.
CPC ............... *G06F 9/45558* (2013.01); *G06F 2009/45587* (2013.01)

(58) Field of Classification Search
None
See application file for complete search history.

(56) References Cited

U.S. PATENT DOCUMENTS

| | | |
|---|---|---|
| 2017/0104730 A1 | 4/2017 | Barnett et al. |
| 2019/0044976 A1 | 2/2019 | Smith |
| 2020/0177517 A1 | 6/2020 | Pancras et al. |
| 2021/0211271 A1 | 7/2021 | Kuang et al. |
| 2021/0266346 A1 | 8/2021 | Gordon et al. |
| 2021/0359955 A1* | 11/2021 | Musleh ............ G06F 15/17331 |
| 2022/0124035 A1* | 4/2022 | Lee .................... H04L 47/2483 |
| 2022/0138309 A1 | 5/2022 | Barnett et al. |
| 2022/0345412 A1* | 10/2022 | Geng .................. H04L 43/0858 |

* cited by examiner

Primary Examiner — Wynuel S Aquino
(74) Attorney, Agent, or Firm — K&L Gates LLP (57) ABSTRACT

Embodiments of the invention are directed to a brokerage platform cloud-based system connected to the mobile apps of users for the sharing of reliable information and the trading of digital assets such as cryptocurrencies, tokens, NFTs and the like. The brokerage platform may consist of multiple nested virtual machines or clusters. These various virtual and guest machines may be referred to interchangeably herein as nodes, clusters, virtual machines, or VMs. Some of these clusters may be configured to receive messages and data packets, identifying transmitters and publishers, identifying the risk scores of these publishers, and prioritizing publishers over each other. Calculations may also be undertaken more efficiently via the use of nested virtual machines or virtual machine clusters than by conventional, non-nested, non-virtualized processing. Nested machines allow several parallel processes to occur simultaneously while maintaining co-location to minimize delays between the various VMs across the different levels of nesting.

20 Claims, 7 Drawing Sheets

MESSAGE SECURITY MANAGEMENT NESTED PLATFORMS

BACKGROUND

Mobile applications (or "mobile apps") are software applications to run on mobile devices, such as smartphones, tablets, etc. Brokerages and their online platforms (or "brokerage platforms" or "platforms") rely heavily on the use of mobile apps to conduct trades and transactions. Mobile apps may also be run on laptops and other capable computing devices. Most users trading cryptocurrencies, tokens, or other forms of digital currencies, items or assets do so via mobile apps. For example, Gemini Mobile is a crypto trading mobile app that has, as of 2022, about 10 million users. However, advanced digital asset and crypto traders also do use laptops and desktops. Mobile security in general and specifically the related digital wallet is of paramount significance in these transactions. The digital wallet stores the private key and other credentials needed to unlock "funds" or digital assets. Such assets can be within the same or other digital wallets or repositories. Also, a digital wallet or a repository, can have its address in the blockchain.

Therefore, there are concerns with the information and messages received by trading mobile apps especially in the unregulated crypto trading space, especially when messages and data packets are transmitted and received via publish and subscribe messaging protocols, which may leave a digital wallet exposed to malicious actors. Trading mobile apps are generally highly concerned about identifying suspicious/fake messages and the ability to block these messages and data packets that may hijack a mobile device and its sensitive information. These messaging protocols in these online trading and brokerage platforms may also be used to deliver fake information or news to users. Performance (latency and packet loss) is also a concern in these subscribe and message protocols.

SUMMARY

In a general aspect, embodiments of the present invention are directed to a brokerage platform cloud-based system connected to the mobile apps of users for the sharing of reliable information and the trading of digital assets such as cryptocurrencies, tokens, NFTs and the like. The brokerage platform may consist of multiple nested virtual machines or virtual machine ("VM") clusters. These various virtual and guest machines may be referred to interchangeably herein as nodes, clusters, virtual machines, or VMs. Some of these clusters may be configured to receive messages and data packets, identifying transmitters and publishers, identifying the risk scores of these publishers, and prioritizing publishers over each other. Calculations may also be undertaken more efficiently via the use of nested virtual machines or virtual machine clusters than by conventional, non-nested, non-virtualized processing. Nested machines allow several parallel processes to occur simultaneously while maintaining co-location to minimize delays between the various VMs across the different levels of nesting.

In several aspects, the first VM cluster or node (interchangeably referred to herein as "first VM cluster") receives a data packet comprising at least one message or data packet for publication at a node of the platform. This may be for publication on the mobile app connected to the brokerage platform for display by mobile devices using the app. The first VM cluster or node can generate a time stamp for the at least one message at the time of receipt, as well as a time cycle for counting frequency of messages received by the first VM cluster during the cycle. Then it may identify the publisher of the message or the transmitter of the message, as the case may be, and determine whether it is an existing legacy publisher or a new publisher that has not communicated previously with the platform.

The identification of the publisher may be done based upon at least one of one or more publisher identifiers ("Pid"), or one or more publisher IP addresses ("Pip"), associated with the message. Then when it is determined whether the transmitter or publisher is an existing or new publisher, the message or data packet received is forwarded to a second VM cluster, which may be a VM cluster or a node that is nested within the first VM cluster. This second VM cluster may refer to two separate and independent clusters depending on whether the publisher is a new or legacy publisher. If it is a new publisher, the second VM cluster where the message is forwarded to may be a VM cluster exclusively for the processing of messages or data packets from new publishers; and if the publisher is a legacy publisher, then the second VM cluster is a VM cluster for the processing of messages or data packets from legacy publishers.

In several aspects, once the second VM cluster receives the message, it then proceeds to populate a publisher vector array with security and quality priority classifications, each classification (i.e., elements of the vector array) being comprised of one or more values, and/or publisher identifier(s) and publisher IP addresse(s). The nested second VM cluster then calculates a total priority score for the publisher based on the publisher vector array. It may also calculate the security priority classifications that are not available for the specific publisher. Once this is done, the platform, the first VM cluster, or the nested second VM cluster may order (e.g., determine a prioritization for) messages according to the total priority score of the publishers. This ordering or prioritization may be applied when the system or brokerage platform meets or exceeds a threshold in usage of memory, buffer, or network traffic, such that the messages are given priority based on this order. One example of an array can be a 1×10 array which may be comprised of [Pid, Pip1, Pip2, Pip3, Value 1, Value 2, Value 3, Value 4, Value 5, Value 6] where the values 1-6 may describe the values of each priority classification, and the priority classification being defined by its location in the array. Multiple sized arrays and configurations may be used.

Embodiments of the present invention can automatically execute algorithms to manage events, requests, data packets, and messages transmitted to the brokerage platform to increase its security and reliability, by identifying and prioritizing transmissions to eliminate publishing untrustworthy information, reduce malicious activities, such as malware, as well as stop unauthorized access to mobile app wallets, user credentials and other platform user secrets. A second benefit is the prevention of data loss during congestion and the improvement to network traffic of the brokerage platform by allowing automatic throttling of message reception and publication, and prioritization of data packets according to the automated algorithms disclosed herein. The management of network traffic occurs in instances where a threshold of memory usage, network traffic, or other resource in the server is exhausted to a threshold level that is met or exceeded. This ensures that computing resources are utilized efficiently and freed up for use for priority documents. These and other benefits can be realized through embodiments of the present invention will be apparent from the description that follows.

FIGURES

Various embodiments of the present invention are described herein by way of example in connection with the following figures.

DESCRIPTION

Figure 1:
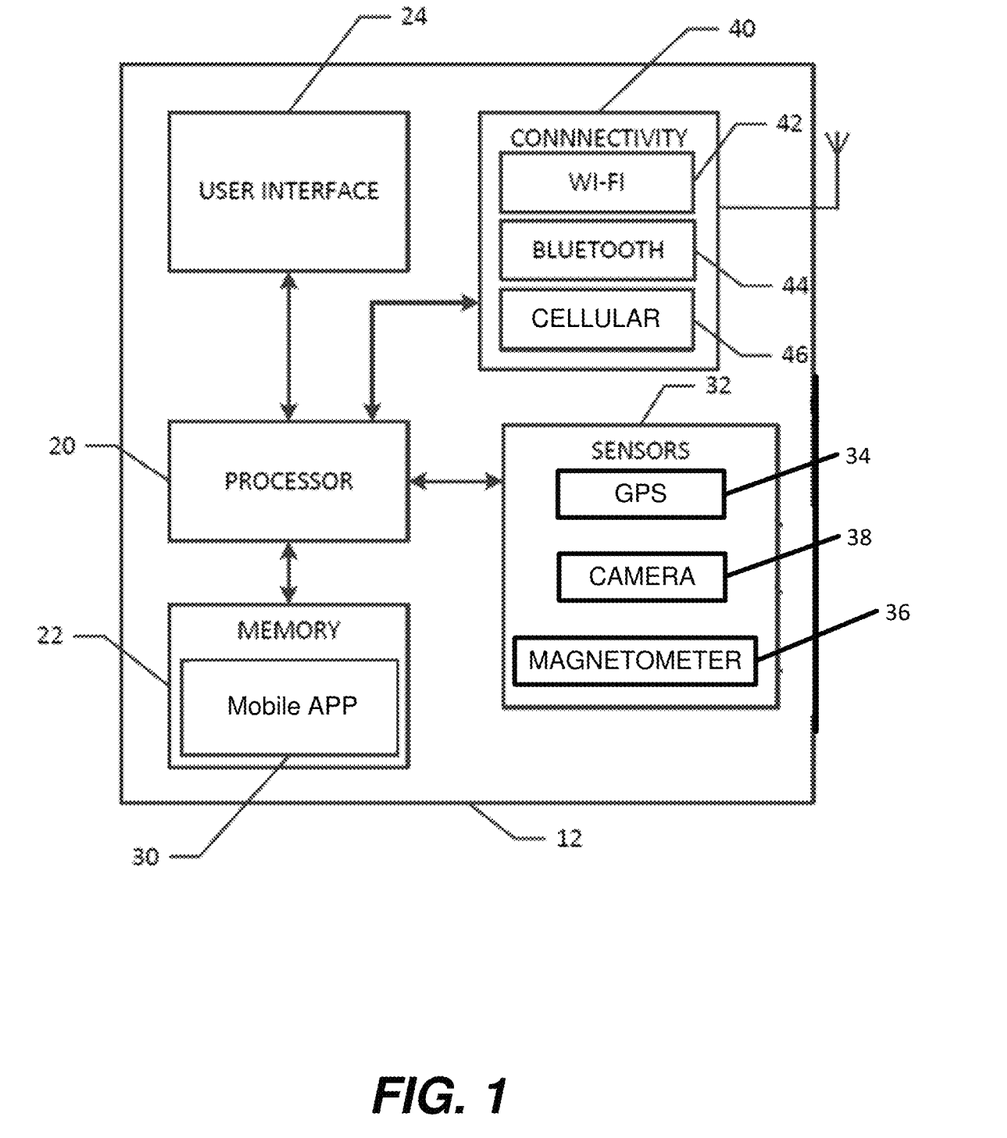
FIG. 1 is a block diagram of a mobile device for executing and running a mobile app connected to a brokerage platform, according to various embodiments of the present invention.

Embodiments of the present invention involve a mobile device that communicates via the Internet or other electronic data network with a brokerage platform. For context, FIG. 1 is a block diagram of the mobile device 12 according to various embodiments. The mobile device 12 may be a smartphone, a tablet computer, a wearable computer (such as smart glasses or a smart watch), or any other suitable mobile computing device. FIG. 1 illustrates some of the components that in at least one example may be employed by or included as part of the mobile device 12. The mobile device 12 includes, for example, at least one processor 20, at least one memory unit 22, and a user interface 24. The memory 22 may include internal Random Access Memory (RAM), Read Only Memory (ROM) and/or flash memory, as well as optional removable storage. The RAM may be, for example, LPDDR2 DRAM; the ROM may include one or more memory chips; the flash memory may include a SSD or emmc flash memory; and the optional removable storage may include a form of microSD card. One or more of these memory units may store the mobile app 30 of the present invention, which is a software application that is executed by the processor 20, which causes the processor 20 to perform the functions and operations programmed by the mobile app 30. The user interface 24 may include a display (such as a LCD, LED, OLED display), a touch interface, and/or haptic systems that are common in today's mobile devices for allowing users to view and input information via the mobile device's display.

The mobile device 12 may also include various sensors 32 that are in communication with the processor 20, including a GPS receiver (or chip) 34 for calculating GPS coordinates (in an assisted GPS process, for example) and/or receiving GPS position coordinates for the mobile device 12. The mobile device 12 may also include a camera system 38 that captures digital images and/or video. The camera system 38 may comprise one or more cameras. The camera(s) of the camera system 38 may comprise, for example, CCD or CMOS sensors. The mobile device 12 may also include a magnetometer 36 and/or other inertial sensors, such as accelerometers and gyroscopes, to detect and quantify motion, and extend the generic sensor API to provide info about the magnetic field as detected by the mobile device 12.

As shown in FIG. 1, the illustrated mobile device 12 also includes a wireless connectivity module 40, which may, for example, include any or all of a WiFi (IEEE 802.11) module 42, a Bluetooth module 44, a cellular network interface (e.g., 4G LTE or 5G) 46, and/or any other suitable wireless interface. The mobile device 12 connects to the internet, for example, wirelessly via one of these interfaces. In this manner, the mobile device 12 can connect to an application server, e.g., an application server of the brokerage platform. For the sake of simplicity, other conventional components of the mobile device 12 are not shown in FIG. 1, such as the power management system, the battery, level translators, the audio system, codecs, USB ports, etc.

Figure 2:
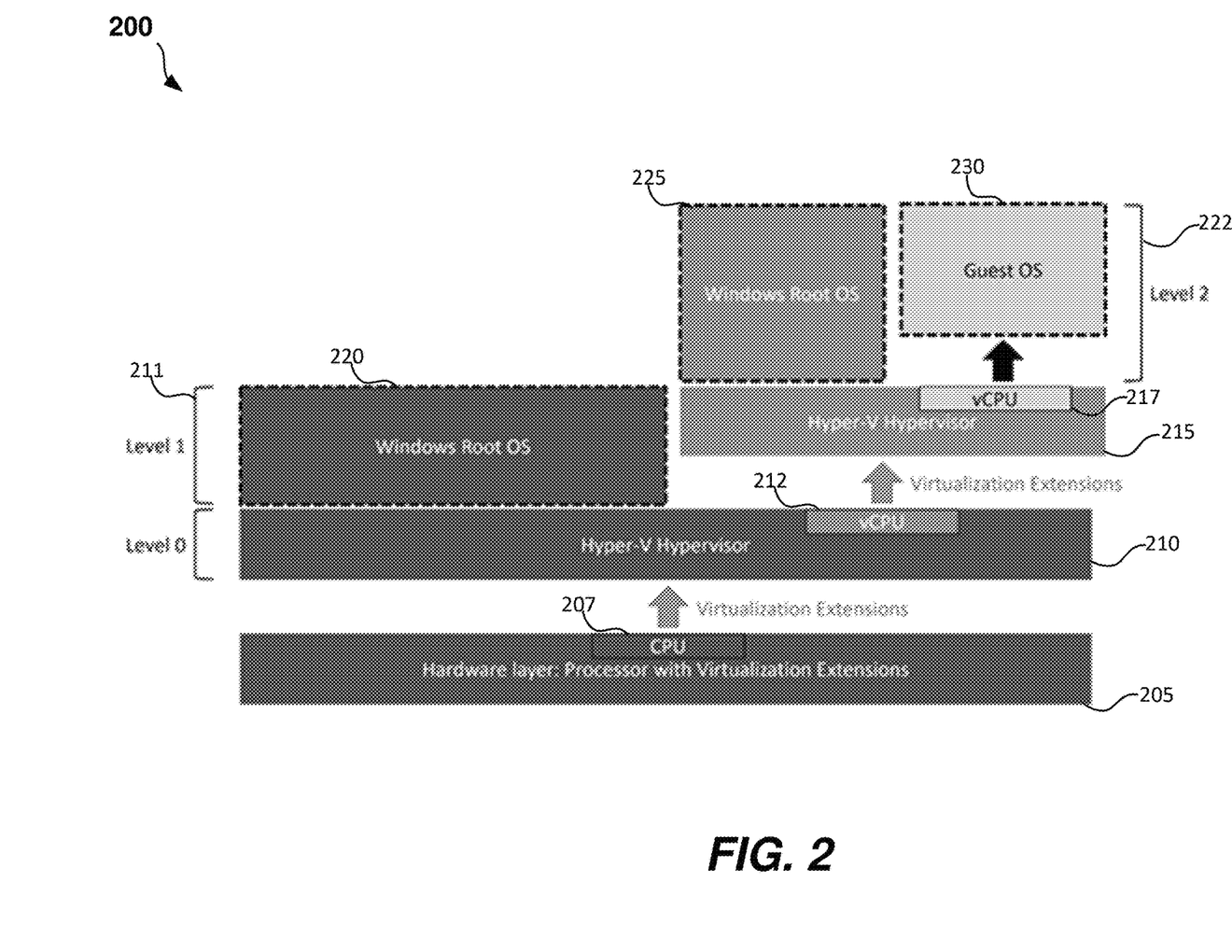
FIG. 2 illustrates a nested virtual cluster system to undertake the methods described herein, according to various embodiments of the present invention.

FIG. 2 illustrates a nested virtual cluster system to undertake the methods described herein, according to various embodiments of the present invention. The nested virtual cluster system preferably is part of the brokerage platform that communicates with the mobile app 30 of the mobile device 12 (see FIG. 1). System 200 includes a hardware layer 205, which includes at least one processor 207. The hardware layer 205 may also comprise memory, storage and other hardware components such as those described in connection with FIGS. 6-7. The processor or CPU 207 may run one or more virtual machines, or virtualization extensions. In one example the processor 207 may execute or run a hypervisor or a Hyper-V hypervisor 210 which manages and controls virtual guest machines, as well as interactions between the root operating system 220 and the hardware layer 205. The hypervisor 210 may include a virtual processor ("vCPU") 212. The vCPU 212 may in turn also run nested virtual machines. An example of one nested virtual machine is the guest OS 230 run by vCPU 217 that belongs to hypervisor 215, which manages the guest OS 230 based on a nested root operating system 225. The hypervisor 215 is nested within the first set of virtual machines or virtual machine clusters, which are run and managed by hypervisor 210 at a second (deeper) virtual level 222 compared to the first level 211 that runs virtual machines at a unnested first level.

Any of hypervisors 210, 215 may run multiple virtual machines or virtual machine clusters, which may be done simultaneously or in parallel. Other levels may be further nested in a similar configuration, for example a third level of virtual machines and hypervisors may be executed by guest OS 230 containing its own vCPU and able to host other virtual machine nodes and clusters. System 200 may therefore comprise multiple nested layers of virtual machine clusters and nodes, as well as various VM clusters and nodes that are on the same nested levels or layers, but undertaking different tasks. In one example, multiple virtual machines or clusters may exist at the same time on level 211, as well as multiple virtual machines or clusters existing at the same time on level 222, with the virtual machines or clusters on the different levels 211, 222 existing simultaneously. In one embodiment, level 222 may contain a virtual machine node or cluster directed to tasks for new publishers, and a separate virtual machine node or cluster directed to tasks related to legacy publishers.

Figure 3:
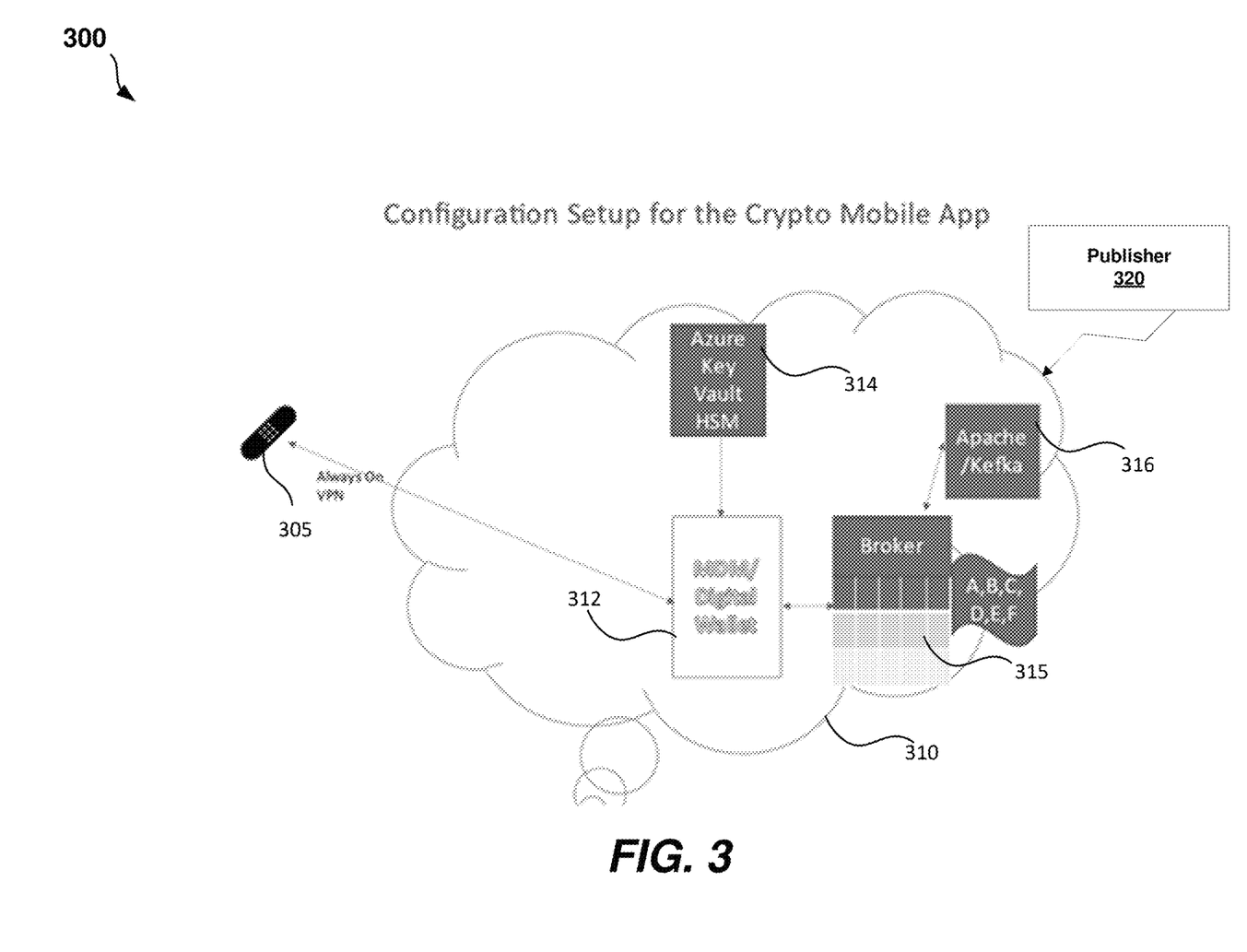
FIG. 3 illustrates connections between the various components of the brokerage platform system to undertake the methods described herein, according to various embodiments of the present invention.

FIG. 3 illustrates connections between the various components of the brokerage platform system to undertake the methods described herein, according to various embodiments of the present invention. FIG. 2 represents a node or a cluster of nodes in cloud-based system/brokerage platform 310 to run the methods disclosed herein. In one embodiment, system 300 may include a mobile device such as mobile device 305, which may run a mobile app that is connected to the cloud-based system/brokerage platform 310. The mobile device 305 could be implemented with the mobile device 12 of FIG. 1, such that the mobile app of the mobile device 305 is the mobile app 30 of FIG. 1. Brokerage platform 310 may be a cloud-based platform composed of, or comprising several components. In one embodiment, the cloud-based system/brokerage platform 310 may comprise a digital wallet node or database 312 that is connected to, and accessible by the mobile app on mobile device 305. The mobile device management (MDM) or digital wallet 312 may also be connected within the cloud-based system/brokerage platform 310 to key vaults 314, which may for example be Azure's Key Management System/key vault solution to provide a secure digital wallet. In several embodiments, the technologies used may be either messaging protocols 316 such as an MQTT protocol as well as the knowledge base discovery of Apache's Kefka, both of which use publish and subscribe techniques. MQTT is a lightweight, publish-subscribe, machine to machine network protocol for Message queue/Message queuing service. It is designed for connections with remote locations that have devices with resource constraints or limited network bandwidth. It preferably runs over a transport protocol that provides ordered, lossless, bi-directional connections—typically, TCP/IP. Apache Kakfa is an open source distributed event streaming platform. MQTT is usually reserved for low bandwidth/error prone transmissions to a very large set of mobile devices, while Kefka is utilized in high speed networks. MQTT protocols in particular require a central node called the broker 315 that manages the publish and subscribe activities for clients and mobile devices participating in system 300. Apache's Kefka may also utilize the broker 315 in some aspects. With these platforms, publishers 320 and subscribers (e.g., mobile app on mobile device 305) are not identified to each other. Furthermore, these platforms do not provide priority scheduling for messages and data packets, thus causing latency and packet loss problems during traffic congestion.

Many of the methods described herein are to be carried out by the broker 315 of the MQTT, for example the broker 315 can moderate, manage, and cleanse data packets, or messages that are transmitted, received from publishers 320 or published by the system 300, for example to the mobile app on device 305. One way it may do this is by classification and categorization of message types to provide a network traffic management protocols and technique to improve the quality of service. In several embodiments, the system 200, FIG. 2 is incorporated as part of broker 315 to undertake the methods described.

In various aspects, the broker 315 or other part of the cloud-based system/brokerage platform 310 may use a history file for identifying publishers 320, their security categorization, and managing data packets and messages received from the accordingly, for example by blocking messages from suspicious (fake) and inaccurate publishers 320, creating a priority scheme for orchestrating fairness and MAC layer performance for publishing time, and invoking a throttling/traffic shaping algorithm when latency is unacceptable during time periods experiencing heavy traffic. In several embodiments, the history file used by broker 315 can be improved by augmenting it with a "knowledge base" of publishers 320 or authors who previously violated data privacy or integrity principles or have other records of malicious behavior. Classification of the very high percentage of publishers 320 abiding with compliance and integrity principles allow the broker 315 to classify certain publishers 320 as safe with their security prioritization scores and others as unsafe. For example, some of these publishers 320 can have associated profiles of high frequency publishing of popular/relevant/concise content generating higher security priority scores while others can generate significantly large content with a minimal relevance that may result in lower security priority scores.

In one example, a client of the broker 315, may use mobile app on device 305 to access the digital wallet 312 via a VPN connection, to undertake transactions with the broker 315, for example purchase and/or sale of digital asset such as cryptocurrencies. The broker 315 provides information as well as messages received from messaging platforms 317 to device 305 via the connected mobile app. The messages from publishers 320 may include data produced from the use of distributed streaming platforms, for real-time event distribution in a distributed cluster, such as Apache's Kefka, to allow for the discovery of patterns by the consumption and production of events in a distributed system. Data in system 300 can include messages from external publishers 320 that are published to clients of the broker 315, to be transmitted and displayed on the mobile app on mobile device 305.

Figure 4:
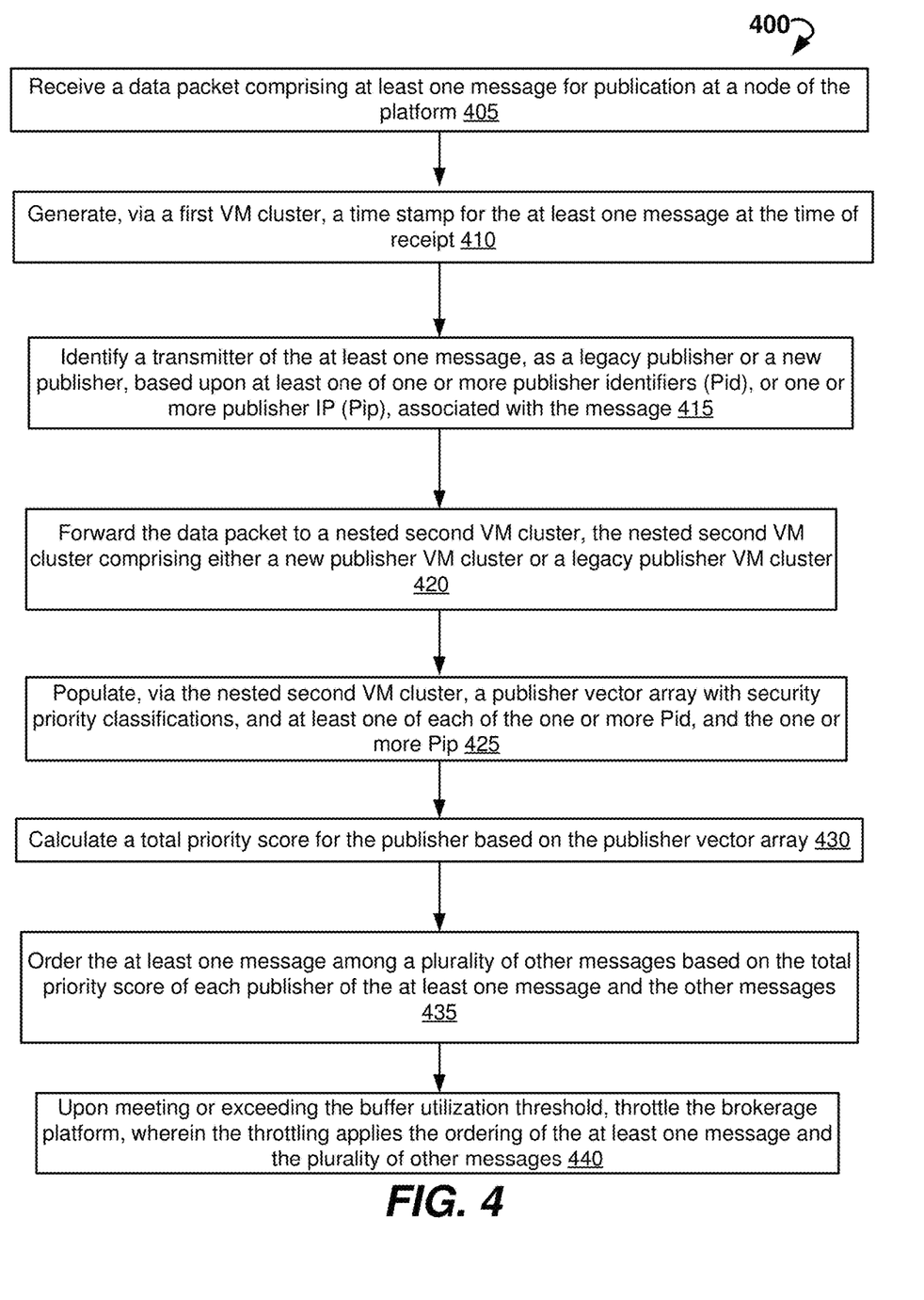
FIG. 4 is a flow chart of a process to provide a message traffic and security management method for a brokerage platform according to various embodiments of the present invention.

FIG. 4 is a flow chart of a process to provide a message traffic and security management method for the brokerage platform according to various embodiments of the present invention. FIG. 4 represents a method 400 that may be undertaken by a broker 315, shown in FIG. 3, for example, or by any other node, cluster, server, and computing device that can utilize the architecture 200 of FIG. 2. In one embodiment, method 400 may comprise a node, VM, or other processor, of a broker or otherwise undertaking these methods, including receiving, from an external source, at step 405, a data packet comprising at least one message for publication at a node of the platform. The message may be informative content, or may be an event, request, instruction, transaction, or other activity occurring on the network, or it may be a message transmitted from an external source, such as a publisher, such as publisher 320, FIG. 3. In various embodiments, a first VM node or cluster ("first VM"), generates at step 410 a time stamp for the at least one message at the time of receiving the message.

In several embodiments, the method 400 identifies at step 415 a transmitter of the at least one message, as a legacy publisher or a new publisher, based upon at least one of one or more publisher identifiers (Pid), or one or more publisher IP (Pip), associated with the message. This identification 415 is generally undertaken by the same VM node or cluster, generally the first VM node or cluster, for example the VM machine 211 on level 1 in FIG. 2, that received the transmitted message at step 405. In several embodiments, incoming publishers are of two categories: legacy publishers whose data/profiles are already in the history database and new publishers who need to be profiled in real time.

Method 400 may continue with the VM machine that identified, at step 415, the transmitter, forwarding, at step 420, the data packet to a nested second VM cluster, the second VM cluster comprising either a new publisher VM cluster or a legacy publisher VM cluster. The nested second VM node or cluster may, for example, be a VM on level 222 of FIG. 2. There may be various 'second VM clusters' or nodes hosted on level 222, where one or more VM nodes or clusters on this level are dedicated to new publishers, and one or more nodes or clusters are dedicated to legacy publishers. In some embodiments, the nested second VM cluster may be generic in its nature and can be used for both legacy and new publishers. The nested node or cluster on the second level 222 in FIG. 2, nested within the first level 211 of FIG. 2, depends therefore, on whether the identifying at step 415 determined that the publisher is a legacy or new publisher, and forwards at step 420 the message to the either a legacy publisher VM node or cluster, or a new publisher VM node or cluster accordingly.

The second VM node or cluster may then populate a publisher vector array with security priority classifications, as well as at least one of each of the one or more publisher identifiers, and the one or more publisher IPs. In various embodiments, the second VM node or cluster retrieves these classifications from a history database. Security priority classifications may be based on and exclusive to classifying the publishers, including their standing in a historic database, the average length of their publications, their relevancy rankings, their popularity standing, their publishing frequency rate, and their arrival time in queue. Any and all of these classifications may be done prior to the message having been received at step 405, and may be modified based on the message, its contents, or its metadata.

In several embodiments, the rankings for each security priority classification may be under three or more levels, for example high, medium, or low, that may be represented by 1, 2, 3, respectively. In several embodiments the elements of the array may be filled in with the ranking value, for example 1, 2, 3, at the position in the array of each security priority classification. In several embodiments, the publishing frequency rate and the arrival time in queue depend on the last transmitted message that was received at step 405, and therefore these classifications are calculated and not retrieved from the history database. In various embodiments the publisher vector array is related to the publisher that transmitted the message, and is a 1×10 vector. In various aspects the top (or first) element comprises the publisher identifier, while the lower six elements in the vector array may comprise the security priority classification values. The other values may be other identifiers or publisher IP addresses.

Once the publisher vector array is populated at step 425, the nested second VM cluster may calculate at step 430 a total priority score for the publisher based on the values in the publisher vector array. Calculating the total priority score of the publisher may be done in some embodiments by a summation of all the values in the publisher vector array. If the numbers 1, 2, 3, correspond to a high relevance, medium relevance, and low relevance (or importance) then a publisher with the lowest total score is the most trusted, while the publishers with the highest score are the least trusted. This numbering and ranking scheme could be undertaken in various other ways and numerical adjustments in other embodiments. The calculating of the scores may also be done offline or before/independent from the receiving step 405 of the message, to minimize real-time compute resource usage.

In several aspects, the method 400 may order at step 435 the publishers in the database and correspondingly order the at least one message in relation to other messages, based on the priority rank of its publisher relevant to other publishers. Accordingly, the at least one message is ordered at step 435 among a plurality of other messages based on the total priority score of each publisher of the at least one message and the total priority score of each publisher of the plurality of other messages. Finally, upon meeting or exceeding a buffer utilization threshold, for example of 80%, which may for example include network traffic, or bandwidth utilization, the system 200 or 300 (see FIG. 2 or 3) for example, may throttle the brokerage platform, for example brokerage platform 310, FIG. 3, wherein the throttling applies the ordering determined at step 435 of the at least one message and the plurality of other messages.

Figure 5:
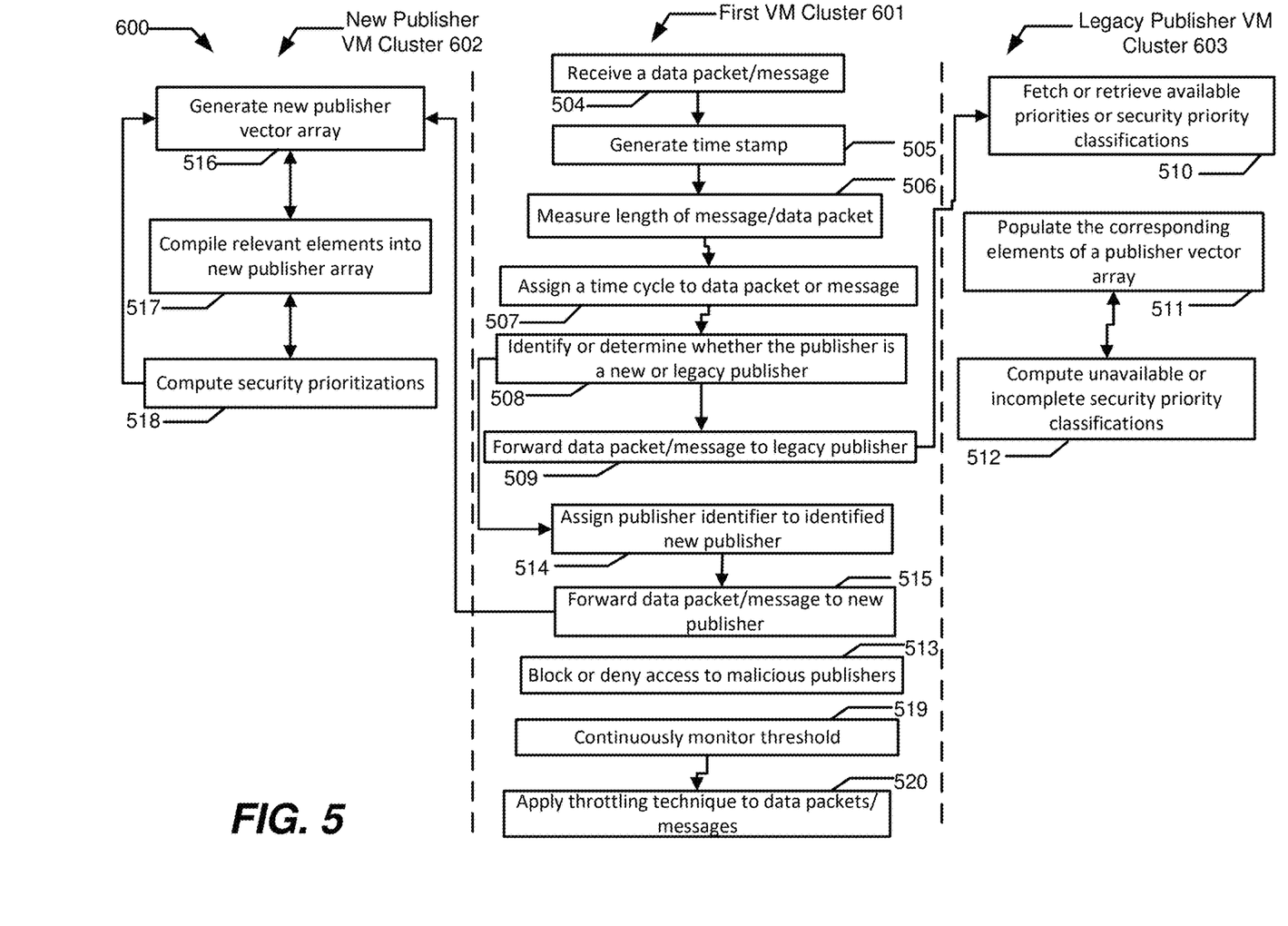
FIG. 5 presents a diagrammatical illustration of the relationship between various components of a system undertaking the various methods to provide a secure brokerage platform publishing system to a mobile app as described herein.

FIG. 5 presents a diagrammatical illustration of the relationship between various components of a system undertaking the various methods for a providing a secure brokerage platform publishing system to a mobile app as described herein. In one embodiment, system 500, may be identical or at least similar to any of systems 200, FIG. 2, or 310, FIG. 3, or their components or a combination thereof. System 500 may have previously interacted with publishers of messages, these known publishers are legacy publishers. Legacy publishers may be classified, ranked and ordered in terms or their reliability, security and other features based on the security priority classifications, such as those discussed in method 400. These legacy publishers may therefore already have fully or partially constructed publisher vector arrays, which do not have to be constructed in real-time during run-time, or when receiving or processing a data packet or message. In various instances, some security priority classifications may have to be calculated in real-time, for example security priority classifications such as the publishing rate of the publisher and the general arrival time in queue of the publisher's messages. Therefore a database or a history database may contain various data, and historical information and classifications of legacy publishers.

In many aspects therefore, a pre-processing priority stack of priority security classifications is built to determine the priority of various publishers and minimize any potential loss or jeopardy of the published data in real-time during processing time or runtime. As use of the system 500 grows over time, some or even all of the screening criteria or security priority classifications can be retrieved quickly, and essentially may become "background" data for "known" participating or legacy publishers from the history database. However, there may be cases where one or more of the security priority classifications will always have to be computed in real time. Additionally, while most of this is done automatically and autonomously by the system 500, or for example system 310 of FIG. 3, some of this background data or security priority classifications may be filled-in or augmented manually by an expert "moderator" or simply set to a default value to avoid any significant influence on calculating the priority. Furthermore, each security priority classification may be given a specific weighting affecting its final value. In other aspect all the security priority classifications have equal weightings. These are dependent on the configuration of system 500.

In several embodiments, the system 500 includes a first VM cluster or node 501 (also "first VM"), a legacy publisher VM cluster or node 502 ("Legacy VM"), and a new publisher VM cluster or node 503 ("new VM"). The legacy VM and the new VM, may be nested within the first VM cluster or node 501 in a manner similar to the nesting of various virtual machines within other VM clusters or nodes in system 200, FIG. 2. In several aspects, once a message is received at step 504 by first VM 501, the process can undertake any or all of the processes undertaken in method 400. For example, the first VM 501 may generate at step 505 a time stamp for the incoming message or data packet. The first VM 501 may also measure at step 506 the length or size of a message or data packet (for example between 21 bytes to 65353 bytes). Measuring the length of each incoming packet gives more precision to the publishing frequency rate. The first VM 501 may also assign, at step 507, a time cycle to each data packet or message. The time cycle assignment at step 507 facilitates a determination of how many messages or data packets or the frequency of such messages received from the publisher by system 500. The time cycle assigned may be an experimental one, for example of one minute, or it may be one that has been pre-determined as a standard time cycle for this and/or other publishers for testing purposes. An example configuration of first VM 501 may comprise: use (Set-VMProcessor-VMName<VMName>-ExposeVirtualizationExtensions $true).

First VM 501 may also determine at step 508, or identify similar to identification process at step 415 of FIG. 4, whether the publisher that transmitted the data packet or message is a legacy or new publisher. This determination or identification of a type of publisher may be undertaken by comparing publisher identifier(s) (Pid) or publisher IP addresse(s) (Pip), or other available comparative metrics, to those stored in the databases of system 500, such as one or more history databases. The first VM may also disqualify or block at step 513 data packets or messages if there is a match with known malicious actors, or publishers or specific black-lists for example. If there is a match with these identifiers, such as Pids, or Pips, with those in databases of system 500, then it may be determined that this is a legacy publisher, and the publisher may be known or identified by the system 500. This match may cause the first VM 501 to forward at step 509 the data packet/message to the legacy VM 502. If there is no match of Pips, Pids or other identifiers or comparative metrics with any known publishers, then the first VM forwards at step 515 the data packet or message to a new VM 503. It may do so after assigning at step 514 a Pid to the new publisher. Because new publishers do not have any security priority classifications, the data packets that go through new VM 503 go through a different process than those being processed by legacy VMs 502.

When forwarding at step 509, 515 to legacy VM 502, and new VM 503 respectively, first VM 501 may undertake the forwarding of steps 509, 515 via shared memory with Pid, Pip, and the packet length. If the forwarding is done to legacy VM 502, then the legacy VM 502 can fetch or retrieve at step 510 available priorities or security priority classifications that had been previously calculated and stored in databases, such as history databases, and populate at step 511 the corresponding elements of the appropriate shared template or a publisher vector array. In various embodiments, for legacy publishers this publisher vector array is pre-populated and this does not need to be computed during runtime. In several embodiments, either one of the legacy VM 502 and the new VM 503 may also be configured using (Set-VMProcessor-VMName<VMName>-ExposeVirtualizationExtensions $true). The publisher VM 502 however selects the security classifications stored in the history database(s) based on the provided Pid and/or Pip(s), to populate at step 511, but it may also compute at step 512 any security priority classifications that need to be computed based on the parameters or data provided with the message or data packet received.

In contrast, in various embodiments, when forwarding at step 515 to new VM 503, then the first VM 501 may assign at step 514 a publisher identifier or Pid, in addition to any other relevant information such as one or more associated Pip it associates to the publisher, and forwards at step 515 this along with the data packet or message. A new template for a publisher vector array is created, generally by new VM 503, for the publisher. In some embodiments, the new publisher vector array is generated or created at step 516 by first VM 501. In most embodiments, it is generated at step 516 by new VM 503. New VM 503 also compiles at step 517 all known elements from the data packet or message and/or its data/metadata to be fed into priority security classifications in the newly generated publisher vector array of the publisher. Whenever priority classifications are missing, or cannot be computed, then a default value may be assigned by any of the nodes computing or compiling the value of that particular priority classification.

Each security priority classification, (in various examples six priority classifications may be used) are entered into a corresponding shared memory slot in the template of each publisher after it is computed. This can be done in real-time. So these new publishers' vectors would remain in direct shared memory, accessible by all VMs 501, 502, 503 until all vectors are filled in a given time cycle. The time cycle that was assigned at step 507 may therefore serve as the time period or a marker for when vectors from all VMs 501, 502, 503 remain in shared memory. In several aspects, not all elements may be collated or compiled at step 517 directly from the data or metadata of the message or data packet, and several security priority classifications must be computed at step 518 by new VM 503. These computed values and security classifications are also input into the newly generated template/publisher vector array, either directly or via a compilation at step 517 that may further process it before inputting it into the new publisher vector array.

When any of legacy VM 502 or new VM 503 computes at steps 512, 518 new security priority classifications, these may be resource intensive with regards to their computational processing. For example, calculating a frequency of messages received during a time cycle may require time-stamping by first VM 501 of every incoming data packet, and then counting by one or more of VMs 501, 502, and 503 the total number of incoming data packets for a specific publisher or under a specific Pid to compute the frequency of arrival during a time cycle. For example, during compute processes 512, 518, a publishing frequency is computed for each publisher transmitting data packers, by dividing the number of packets received from a given publisher of the time cycle for example in seconds. This could be done in a temporary workplace, for example a scratch pad in memory space (e.g., a high-speed internal memory used for temporary storage of calculations). Then publishers may be divided into various classes of ascending or descending order of their calculated frequencies and assigned a priority classification value for this parameter, to be fed into the vector publisher array.

Another example of a security priority classification that may be calculated in real-time runtime is that of the arrival time of queue of the messages. While one node such as first VM 501 may receive the data packets, another node or VM such as legacy VM 502 or new VM 503, may arrange in another scratch pad location in memory, all the time stamped packets for competing publishers transmitting messages, in an order, and splitting the sequence of total cycle time participants into multiple categories, for example, three categories: priorities 1, 2, 3. The value of the security priority classification of time arrival in queue then may be assigned based on these priorities and input into a vector publisher array.

In various aspects, some priority classifications that are computed may drive the results of other security priority classifications, and therefore, the computation steps 512, 518 may have to be done in particular order, or simultaneously within compiling or populating various classifications at steps 517, 511 respectively. To ensure the efficiency of such a system, and minimize downtime, network lag, or network traffic issues, the use of Virtual Machine (VM) nesting for each publisher can be deployed, similar to the configuration in system 200, FIG. 2. New VM 503 for example may be created for each new publisher that is transmitting a message during a specific time cycle. In some embodiments, one new VM node or cluster 503 is sufficient for calculating at step 518 the security priority classification of multiple publishers. The nested configuration is advantageous because of the need for real time priority computations when the buffer is especially saturated, e.g., for computing the frequency of publishing and the message arrival time.

In several aspects of the invention and in relation to all the previous FIGS. 1-5 described, a buffer utilization counter may continuously monitor at step 519 for memory, bandwidth or network utilization. This counter may be executed on the first VM 501, or a VM with visibility over all the over VMs, or one that shares access to live information from all the other nodes, for example through a shared memory space. A pre-determined threshold may be set for which the buffer utilization country may be monitoring. If the pre-determined threshold is met or exceeded then a throttling technique may be applied at step 520, for example similar to throttling step 440 of FIG. 4. A throttling technique may be applied by Azure platforms, AWS, or Kefka running as part of brokerage platform 310 of FIG. 3, for example, and may limit the number of messages received, processed, or published within certain determined or assigned time cycles. Furthermore, messages may be assigned and carried on to future time cycles by system 500.

Figure 6:
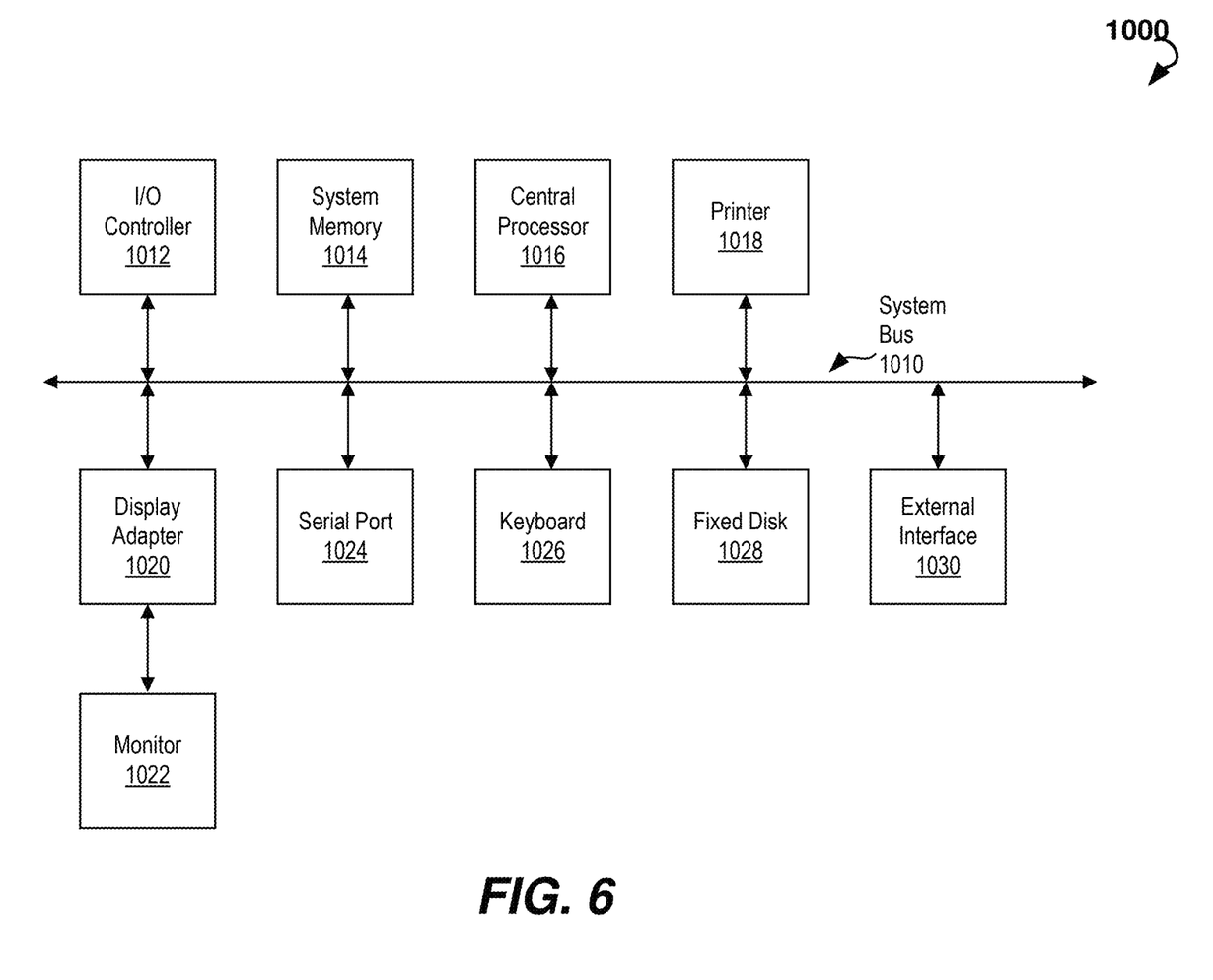
FIG. 6 presents a block diagram of a computer apparatus, according to at least aspect of the present disclosure.

FIG. 6 is a block diagram of a computer apparatus 3000 with data processing subsystems or components, which a set of instructions to perform any one or more of the methodologies discussed herein may be executed, according to at least one aspect of the present disclosure. The subsystems shown in FIG. 6 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

Figure 7:
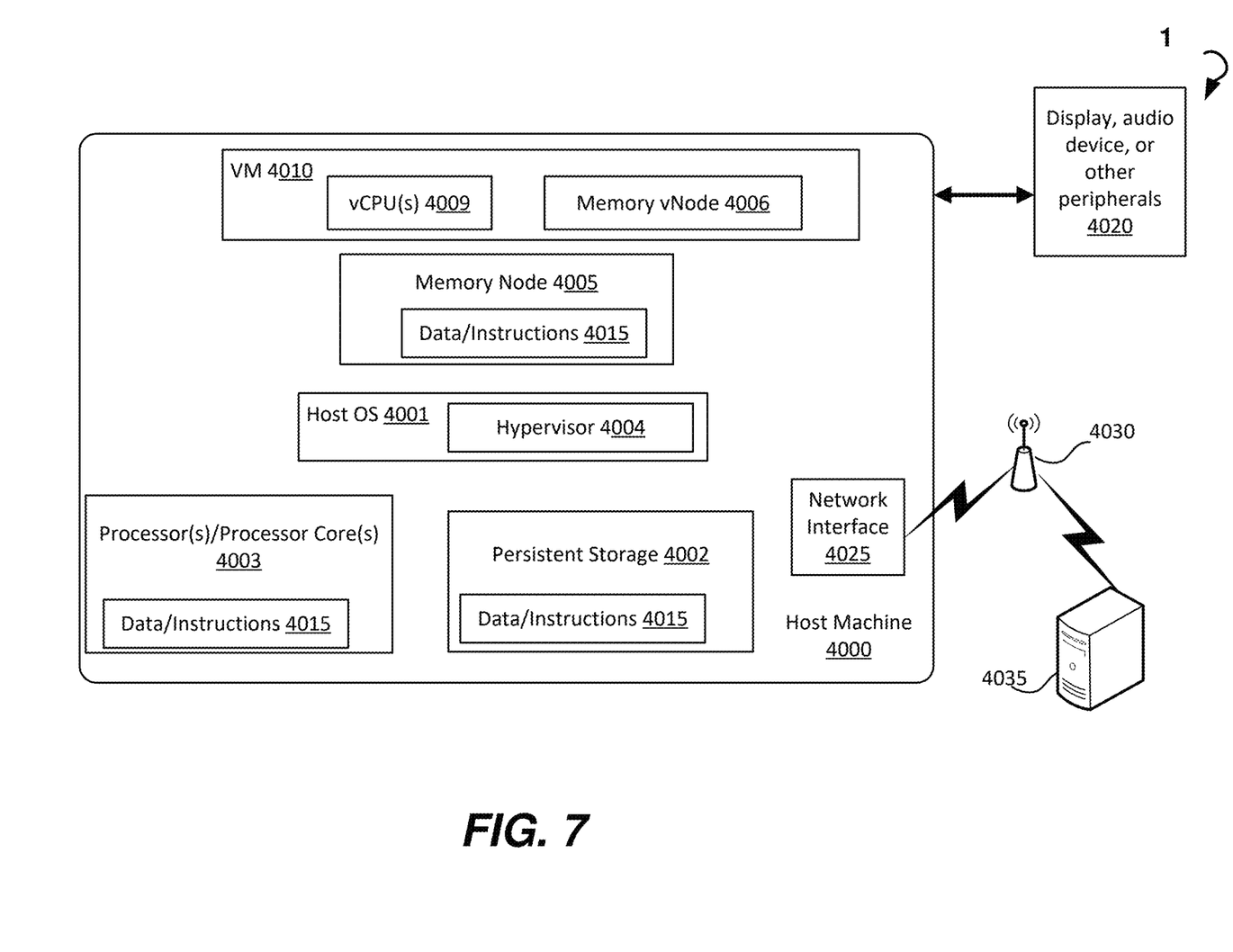
FIG. 7 is a diagrammatic representation of an example system that includes a host machine within which a set of instructions to perform any one or more of the methodologies discussed herein may be executed.

FIG. 7 is a diagrammatic representation of an example system 4000 that includes a host machine 4002 within which a set of instructions to perform any one or more of the methodologies discussed herein may be executed, according to at least one aspect of the present disclosure. For example, host machine 4000 may comprise of hardware layer 205 to run the various virtual components 210-230 in system 200, FIG. 2. Host machine 2000 may also be used as a node or within a cluster of nodes in system 300, FIG. 3, to execute one or more processes of the method 500, FIG. 5. Host machine 4000 may also host the VM clusters 601-603, FIG. 6. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

Clause 1. A message traffic and security management method for a brokerage platform (platform), the method comprising receiving, by a first VM cluster of the platform, a data packet comprising at least one message for publication at a node of the platform; generating, via the first VM cluster, a time stamp for the at least one message at the time of receipt; identifying, by the first VM cluster, a transmitter of the at least one message, as a legacy publisher or a new publisher, based upon at least one of one or more publisher identifiers (Pid), or one or more publisher IP (Pip), associated with the message; based on the identifying of the transmitter as the legacy publisher or the new publisher, forwarding, y the first VM cluster, the data packet to a nested second VM cluster of the platform, the nested second VM cluster comprising either a new publisher VM cluster or a legacy publisher VM cluster; populating, via the nested second VM cluster, a publisher vector array for the transmitter of the at least one message with security priority classifications, and at least one of each of the one or more Pid, and the one or more Pip; calculating, by the nested second VM cluster, a total priority score for the transmitter based on the publisher vector array; ordering, bye nested second VM cluster, the at least one message among a plurality of other messages received by the platform from other external publishers, wherein the ordering is based on the total priority score for the transmitter of the at least one message and total priority scores for the other external publishers; and upon meeting or exceeding a buffer utilization threshold, throttling the brokerage platform, wherein the throttling applies the ordering of the at least one message and the plurality of other messages.

Clause 2. The method of clause 1, further comprising retrieving, via the nested second VM cluster, available security priority classifications from a history database.

Clause 3. The method of any of clauses 1-2, wherein the identifying comprises finding a match for the transmitter in a history database based upon at least one of a publisher identifier (Pid), or a publisher IP (Pip), wherein a match indicates a legacy publisher, and no match indicates a new publisher.

Clause 4. The method of any of clauses 1-3, further comprising based upon identification of the transmitter as a new publisher, assigning, via the nested second VM cluster, a new publisher identifier for the new publisher; and generating the publisher vector array.

Clause 5. The method of any of clauses 1-4, further comprising calculating values for the security priority classifications for the new publisher, to be used for the publisher vector array.

Clause 6. The method of any of clauses 1-5, further comprising assigning a time cycle, via the first VM cluster, for the at least one message to compute a frequency of data packets received during the time cycle.

Clause 7. The method of any of clauses 1-6, further comprising storing the total priority score in a history database related to the publisher.

Clause 8. The method of any of clauses 1-7, wherein the throttling comprises allowing at least one of receipt, processing, or publication of the at least one message based on the total priority score of the publisher in a specific order relative to other messages based on the total priority score of each of the other messages.

Clause 9. The method of any of clauses 1-8, wherein the nested second VM cluster comprises at least two independent nested VM clusters nested within the first VM cluster, the nested second VM cluster comprising at least one legacy publisher VM cluster, and one new publisher VM cluster.

Clause 10. The method of any of clauses 1-9, further comprising blocking a message, based on at least one of the Pip or Pid being associated with a disqualified publisher.

Clause 11. The method of any of clauses 1-10, further comprising measuring a length of the received data packet.

Clause 12. The method of any of clauses 1-11, further comprising calculating unavailable security priority classifications.

Clause 13. The method of any of clauses 1-12, wherein available security priority classifications comprise values for at least one of a historic database standing, an average length of a publication, a relevance ranking, a popularity standing, and wherein the unavailable security priority classifications comprise a publishing frequency rate, and an arrival time in queue.

Clause 14. The method of any of clauses 1-13, wherein the publisher vector array is a 1×10 vector.

Clause 15. A cloud-based broker platform system (platform system) comprising a plurality of nested virtual machines comprising a first VM cluster; the first VM cluster comprising a processor; and a memory in communication with the processor, the memory comprising a set of instruction, when executed cause the processor to receive a data packet comprising at least one message for publication by the platform system; generate a time stamp for the at least one message at the time of receipt; identify a transmitter of the message, based upon at least one of a publisher identifier (Pid), or one or more publisher IP (Pip), received with the message; based on the identifying of the transmitter as a legacy publisher or a new publisher, forwarding the data packet to a nested second VM cluster nested within the first VM cluster, the nested second VM cluster comprising either a new publisher VM cluster or a legacy publisher VM cluster; the second VM cluster comprising a processor; and a memory in communication with the processor, the memory comprising a set of instruction, when executed cause the processor to configured to retrieve, security priority classifications from a history database; populate, a publisher vector array for the transmitter of the at least one message, the publisher vector array comprising the security priority classifications, and at least one of each of the Pid, and the one or more Pip; calculate a total priority score for the transmitter based on the publisher vector array; upon meeting or exceeding a buffer utilization threshold, ordering the at least one message among a plurality of other messages received by the platform from other external publishers, wherein the ordering is based on the total priority score for the transmitter of the at least one message and total priority scores for the other external publishers; and throttling the platform system, wherein the throttling applies the ordering of the at least one message among the plurality of other messages.

Clause 16. The system of clause 15, wherein the further set of instructions in the memory of the first VM cluster, when executed further cause the processor to publish the at least one message to a secure mobile app connected to the platform system; and cause display of the at least one message on the secure mobile app.

Clause 17. The system of clauses 15-16, wherein the set of instructions in the memory of the second nested VM cluster, when executed cause the processor to upon identification of the transmitter as a new publisher, assigning, a new publisher identifier for the new publisher; generating the publisher vector array; and calculating values for the security priority classifications for the new publisher, to be used for the publisher vector array.

Clause 18. The system of clauses 15-17, wherein the set of instructions in the memory of the first VM cluster, when executed further cause the processor to assigning a time cycle, via the first VM cluster, for the at least one message to compute a frequency of data packets received during the time cycle.

Clause 19. A non-transitory computer-readable storage medium having embodied thereon a program, the program executable by a processor to perform a method for message traffic and security management for a platform, the method comprising receiving, by a first VM cluster of the platform, a data packet comprising at least one message for publication at a node of the platform; generating, via the first VM cluster, a time stamp for the at least one message at the time of receipt; identifying, by the first VM cluster, a transmitter of the at least one message, as a legacy publisher or a new publisher, based upon at least one of one or more publisher identifiers (Pid), or one or more publisher IP (Pip), associated with the message; based upon the identifying of the transmitter as the legacy publisher or the new publisher, forwarding, by the first VM cluster, the data packet to a nested second VM cluster, the nested second VM cluster associated with either legacy publishers or new publishers; populating, via the nested second VM cluster, a publisher vector array for the transmitter of the at least one message with security priority classifications, and at least one of each of the one or more Pid, and the one or more Pip; calculating, by the nested second VM cluster, a total priority score for the publisher based on the publisher vector array; ordering, by the nested second VM cluster, the at least one message among a plurality of other messages received by the platform from other external publishers, wherein the ordering is based on the total priority score for the transmitter of the at least one message and total priority scores for the other external publishers; and upon meeting or exceeding a buffer utilization threshold, throttling the platform, wherein the throttling applies the ordering of the at least one message and the plurality of other messages, by allowing at least one of receipt, processing, or publication of the at least one message based on the total priority score of the publisher in a specific order relative to other messages.

Clause 20. The non-transitory computer-readable storage medium of claim 19, wherein the method further comprises compiling elements from at least one of the data packet or the at least one message, via the nested second VM cluster, to calculate new security priority classifications.

The foregoing detailed description includes references to the accompanying drawings, which form a part of the detailed description. The drawings show illustrations in accordance with exemplary aspects. These example aspects, which are also referred to herein as "examples," are described in enough detail to enable those skilled in the art to practice the present subject matter.

The various aspects described above, are presented as examples only, and not as a limitation. The descriptions are not intended to limit the scope of the present technology to the forms set forth herein. To the contrary, the present descriptions are intended to cover such alternatives, modifications, and equivalents as may be included within the scope of the present technology as appreciated by one of ordinary skill in the art.

While specific aspects of, and examples for, the system are described above for illustrative purposes, various equivalent modifications are possible within the scope of the system, as those skilled in the relevant art will recognize. For example, while processes or steps are presented in a given order, alternative aspects may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The aspects can be combined, other aspects can be utilized, or structural, logical, and electrical changes can be made without departing from the scope of what is claimed. It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. The detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.).

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited in the form disclosed. Many modifications and variations will be apparent to those of ordinary skill in the art without departing from the scope of the claimed subject matter. Exemplary aspects were chosen and described to best explain the principles of the present technology and its practical application, and to enable others of ordinary skill in the art to understand the various aspects of the present disclosure with various modifications as are suited to the particular use contemplated.

What is claimed is:

1. A message traffic and security management method for a brokerage platform (platform), the method comprising:
   receiving, by a first VM cluster of the platform, a data packet comprising at least one message for publication at a node of the platform;
   generating, via the first VM cluster, a time stamp for the at least one message at a time of receipt;
   identifying, by the first VM cluster, a transmitter of the at least one message, as a legacy publisher or a new publisher, based upon at least one of one or more publisher identifiers (Pid), or one or more publisher IP (Pip), associated with the at least one message;
   based on the identifying of the transmitter as the legacy publisher or the new publisher, forwarding, the first VM cluster, the data packet to a nested second VM cluster of the platform, the nested second VM cluster comprising either a new publisher VM cluster or a legacy publisher VM cluster;
   populating, via the nested second VM cluster, a publisher vector array for the transmitter of the at least one message with security priority classifications, and at least one of each of the one or more Pid, and the one or more Pip;

calculating, by the nested second VM cluster, a total priority score for the transmitter based on the publisher vector array;
ordering, bye nested second VM cluster, the at least one message among a plurality of other messages received by the platform from other external publishers, wherein the ordering is based on the total priority score for the transmitter of the at least one message and total priority scores for the other external publishers; and
upon meeting or exceeding a buffer utilization threshold, throttling the platform, wherein the throttling applies the ordering of the at least one message and the plurality of other messages.

2. The method of claim 1, further comprising:
retrieving, via the nested second VM cluster, available security priority classifications from a history database.

3. The method of claim 1, wherein the identifying comprises finding a match for the transmitter in a history database based upon at least one of a publisher identifier (Pid), or a publisher IP (Pip), wherein a match indicates a legacy publisher, and no match indicates a new publisher.

4. The method of claim 1, further comprising:
based upon identification of the transmitter as a new publisher, assigning, via the nested second VM cluster, a new publisher identifier for the new publisher; and
generating the publisher vector array.

5. The method of claim 4, further comprising:
calculating values for the security priority classifications for the new publisher, to be used for the publisher vector array.

6. The method of claim 1, further comprising:
assigning a time cycle, via the first VM cluster, for the at least one message to compute a frequency of data packets received during the time cycle.

7. The method of claim 1, further comprising:
storing the total priority score in a history database related to the publisher.

8. The method of claim 1, wherein the throttling comprises allowing at least one of receipt, processing, or publication of the at least one message based on the total priority score of the publisher in a specific order relative to other messages based on the total priority score of each of the other messages.

9. The method of claim 1, wherein the nested second VM cluster comprises at least two independent nested VM clusters nested within the first VM cluster, the nested second VM cluster comprising at least one legacy publisher VM cluster, and one new publisher VM cluster.

10. The method of claim 1, further comprising:
blocking a message, based on at least one of the Pip or Pid being associated with a disqualified publisher.

11. The method of claim 1, further comprising:
measuring a length of the received data packet.

12. The method of claim 1 further comprising:
calculating unavailable security priority classifications.

13. The method of claim 12, wherein available security priority classifications comprise values for at least one of a historic database standing, an average length of a publication, a relevance ranking, a popularity standing, and wherein the unavailable security priority classifications comprise a publishing frequency rate, and an arrival time in queue.

14. The method of claim 1, wherein the publisher vector array is a 1×10 vector.

15. A cloud-based broker platform system (platform system) comprising:
a plurality of nested virtual machines comprising a first VM cluster;
the first VM cluster comprising a processor; and a memory in communication with the processor, the memory comprising a set of instruction, when executed cause the processor to:
receive a data packet comprising at least one message for publication by the platform system;
generate a time stamp for the at least one message at a time of receipt;
identify a transmitter of the message, based upon at least one of a publisher identifier (Pid), or one or more publisher IP (Pip), received with the at least one message;
based on the identifying of the transmitter as a legacy publisher or a new publisher, forwarding the data packet to a nested second VM cluster nested within the first VM cluster, the nested second VM cluster comprising either a new publisher VM cluster or a legacy publisher VM cluster;
the second VM cluster comprising a processor; and a memory in communication with the processor, the memory comprising a set of instruction, when executed cause the processor to configured to:
retrieve, security priority classifications from a history database;
populate, a publisher vector array for the transmitter of the at least one message, the publisher vector array comprising the security priority classifications, and at least one of each of the Pid, and the one or more Pip;
calculate a total priority score for the transmitter based on the publisher vector array;
upon meeting or exceeding a buffer utilization threshold, ordering the at least one message among a plurality of other messages received by the platform from other external publishers, wherein the ordering is based on the total priority score for the transmitter of the at least one message and total priority scores for the other external publishers; and
throttling the platform system, wherein the throttling applies the ordering of the at least one message among the plurality of other messages.

16. The system of claim 15, wherein the set of instructions in the memory of the first VM cluster, when executed further cause the processor to:
publish the at least one message to a secure mobile app connected to the platform system; and
cause display of the at least one message on the secure mobile app.

17. The system of claim 15, wherein the set of instructions in the memory of the second nested VM cluster, when executed cause the processor to:
upon identification of the transmitter as a new publisher, assigning, a new publisher identifier for the new publisher;
generating the publisher vector array; and
calculating values for the security priority classifications for the new publisher, to be used for the publisher vector array.

18. The system of claim 15, wherein the set of instructions in the memory of the first VM cluster, when executed further cause the processor to:
assigning a time cycle, via the first VM cluster, for the at least one message to compute a frequency of data packets received during the time cycle.

19. A non-transitory computer-readable storage medium having embodied thereon a program, the program executable by a processor to perform a method for message traffic and security management for a platform, the method comprising:

receiving, by a first VM cluster of the platform, a data packet comprising at least one message for publication at a node of the platform;

generating, via the first VM cluster, a time stamp for the at least one message at a time of receipt;

identifying, by the first VM cluster, a transmitter of the at least one message, as a legacy publisher or a new publisher, based upon at least one of one or more publisher identifiers (Pid), or one or more publisher IP (Pip), associated with the at least one message;

based upon the identifying of the transmitter as the legacy publisher or the new publisher, forwarding, by the first VM cluster, the data packet to a nested second VM cluster, the nested second VM cluster associated with either legacy publishers or new publishers;

populating, via the nested second VM cluster, a publisher vector array for the transmitter of the at least one message with security priority classifications, and at least one of each of the one or more Pid, and the one or more Pip;

calculating, by the nested second VM cluster, a total priority score for the publisher based on the publisher vector array;

ordering, by the nested second VM cluster, the at least one message among a plurality of other messages received by the platform from other external publishers, wherein the ordering is based on the total priority score for the transmitter of the at least one message and total priority scores for the other external publishers; and upon meeting or exceeding a buffer utilization threshold, throttling the platform, wherein the throttling applies the ordering of the at least one message and the plurality of other messages, by allowing at least one of receipt, processing, or publication of the at least one message based on the total priority score of the publisher in a specific order relative to other messages.

20. The non-transitory computer-readable storage medium of claim 19, wherein the method further comprises:

compiling elements from at least one of the data packet or the at least one message, via the nested second VM cluster, to calculate new security priority classifications.

* * * * *